(12) United States Patent
Muraoka et al.

(10) Patent No.: US 10,031,274 B2
(45) Date of Patent: *Jul. 24, 2018

(54) LIGHT GUIDE PLATE

(71) Applicant: OMRON Corporation, Kyoto-shi, Kyoto (JP)

(72) Inventors: Eiji Muraoka, Hashima-gun (JP); Takeshi Kakinuma, Kaizu (JP); Yoshihiko Takagi, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 193 days.

This patent is subject to a terminal disclaimer.

(21) Appl. No.: 15/156,387

(22) Filed: May 17, 2016

(65) Prior Publication Data

US 2016/0377792 A1 Dec. 29, 2016

(30) Foreign Application Priority Data

Jun. 26, 2015 (JP) .................................. 2015-129209

(51) Int. Cl.
*F21V 8/00* (2006.01)
*G07F 17/34* (2006.01)
*G07F 17/32* (2006.01)

(52) U.S. Cl.
CPC .......... *G02B 6/0036* (2013.01); *G02B 6/0061* (2013.01); *G07F 17/3213* (2013.01); *G07F 17/3248* (2013.01); *G07F 17/34* (2013.01); *G02B 6/006* (2013.01)

(58) Field of Classification Search
CPC .. G07F 17/34; G07F 17/3248; G07F 17/3213; G02B 6/0036; G02B 6/0061; G02B 6/006
See application file for complete search history.

(56) References Cited

U.S. PATENT DOCUMENTS

| 2005/0024555 A1* | 2/2005 | Shiraishi | G02B 6/0043 349/67 |
| 2009/0096965 A1* | 4/2009 | Nagata | G02F 1/133305 349/103 |
| 2013/0252709 A1* | 9/2013 | Lee | G02F 1/133615 463/20 |

FOREIGN PATENT DOCUMENTS

| JP | 2003-519810 A | 6/2003 |
| JP | 2011-244930 A | 12/2011 |

* cited by examiner

*Primary Examiner* — Sonji Johnson
(74) *Attorney, Agent, or Firm* — Metrolexis Law Group, PLLC

(57) ABSTRACT

A light guide plate includes a diffusing surface that diffuses incident light having a concave cylindrical surface shape with curvature in a first direction, and an exit surface having a convex cylindrical surface shape with curvature in the first direction. The light guide plate is constituted such that a pattern provided behind the diffusing surface is visible from the exit surface side. The light guide plate has an incident surface on at least one end of the light guide plate in the first direction, and prisms that are formed in the diffusing surface and reflect visible light from a light source that enters the light guide plate from the incident surface toward the exit surface. Each prism has a reflecting surface oriented toward the incident surface side, and an angle between the reflecting surface and the diffusing surface increases, the further the prism is from the incident surface.

9 Claims, 6 Drawing Sheets

LIGHT GUIDE PLATE

CROSS-REFERENCES TO RELATED APPLICATIONS

This application claims priority to Japanese Patent Application No. 2015-129209 filed Jun. 26, 2015, the entire contents of which are incorporated herein by reference.

FIELD

The present invention relates to a light guide plate.

BACKGROUND

Conventionally, there are game machines such as slot machines or pinball machines that are provided with a decoration device that shows a pattern such as a logo mark or characters depicted on a display panel to gamers by spreading the light from a light source over a wide range with a light guide plate and using that light to illuminate the display panel on which the pattern is depicted (e.g., see JP 2011-244930).

With the decoration device disclosed in JP 2011-244930, switching the pattern that is displayed was not envisaged. On the other hand, being able to switch the pattern that is displayed according to the state of the game is preferable in order to enhance the gamer's enjoyment. Meanwhile, an illumination device that has a tabularly formed light guide plate having light transmittance and that causes a pattern that depends on the incident direction of light on the light guide plate to be displayed has been proposed (e.g., see JP 2003-519810).

For example, the illumination device disclosed in JP 2003-519810 has a panel made from a light transmissive material, and the panel has a light exit window, a back wall opposing the light exit window, and light transmissive first and second end surfaces that are arranged between the light exit window and the back wall in different positions to each other. A first optical symbol formed on the back wall is displayed as a result of light that enters the panel from a light source opposing the first end surface being reflected by a plurality of triangular prisms arranged side-by-side on the first optical symbol and exiting from a light exit surface. On the other hand, a second optical symbol formed on the back wall is displayed as a result of light that enters the panel from a light source opposing the second end surface being reflected by a plurality of triangular prisms arranged side-by-side on the second optical symbol and exiting from the light exit surface. JP 2011-244930 and JP 2003-519810 are examples of background art.

SUMMARY

In the illumination device disclosed in JP 2003-519810, a light source is provided for every pattern to be displayed. Thus, in the case where this illumination device is installed in a game machine, an arrangement space for every light source needs to be secured in the game machine. Since the wiring and number of substrates for driving these light sources also increase when the number of light sources increases, this configuration leads to an increase in cost and is not preferable. Furthermore, securing space for wiring paths becomes difficult as the number of light sources increases, resulting in the internal structure of a game machine becoming more complex.

Also, it is envisaged that the light guide plate disclosed in JP 2011-244930 and the illumination device disclosed JP 2003-519810 will be provided in a tabular region. On the other hand, slot machines have a structure with a curved surface such as a drum, and in the case of carrying out presentation of such a structure, the light guide plate disclosed in JP 2011-244930 and the illumination device disclosed in JP 2003-519810 cannot be directly utilized.

In view of this, an object of the present invention is to provide a light guide plate that is providable in a structure with a curved surface, and is able to suppress the number of the light sources required in switching display patterns.

A light guide plate is provided as one mode of the present invention. In this light guide plate, a diffusing surface that diffuses incident light is formed to have a concave cylindrical surface shape with curvature in a first direction, an exit surface opposing the diffusing surface is formed to have a convex cylindrical surface shape with curvature in the first direction, and the light guide plate is constituted such that a pattern provided behind the diffusing surface is visible from the exit surface side. Furthermore, this light guide plate includes an incident surface formed on at least one end of the light guide plate in the first direction, and a plurality of prisms that are formed in the diffusing surface and reflect visible light that enters the light guide plate from the incident surface toward the exit surface. Each of the plurality of prisms has a reflecting surface oriented toward the incident surface side, and an angle between the reflecting surface and the diffusing surface increases, the further the prism is from the incident surface.

In this light guide plate, preferably the plurality of prisms are arranged along a predetermined pattern.

Furthermore, in this light guide plate, preferably each of the plurality of prisms is formed such that an area of the reflecting surface increases the closer the prism is to the incident surface among the plurality of prisms.

A light guide plate according to the present invention achieves the effects of being providable in a structure with a curved surface, and being able to suppress the number of the light sources required to switch display patterns.

DETAILED DESCRIPTION

Hereinafter, a light guide plate according to one embodiment of the present invention will be described, with reference to the drawings. In this light guide plate, a diffusing surface that diffuses incident light has a shape curved into a concave cylindrical surface, so as to be arrangeable, in a drum unit including a plurality of cylindrically formed drums, along the surface of each drum near the boundary of the drum. An exit surface opposing the diffusing surface of the light guide plate also has a shape curved into a convex cylindrical surface. Furthermore, both ends of the light guide plate in the direction in which the light guide plate has curvature are each formed as an incident surface opposing a light source. A plurality of prisms that reflect visible light that has been emitted from the light source and entered the light guide plate toward the exit surface are formed in the diffusing surface. The plurality of prisms are respectively arrayed according to the shape of the pattern to be displayed. Each prism is formed such that the angle of a reflecting surface to the diffusing surface increases, the more distant the prism is from the incident surface, so that light propagated inside the light guide plate exits toward the gamer.

Furthermore, a display panel having a different pattern is provided on the diffusing surface side of this light guide plate, and even when the light source is off, the gamer can see that pattern through the light guide plate.

Note that, hereinafter, for convenience of description, the side opposing the gamer is deemed to be the front surface, and the opposite side is deemed to be the back surface.

Figure 1:
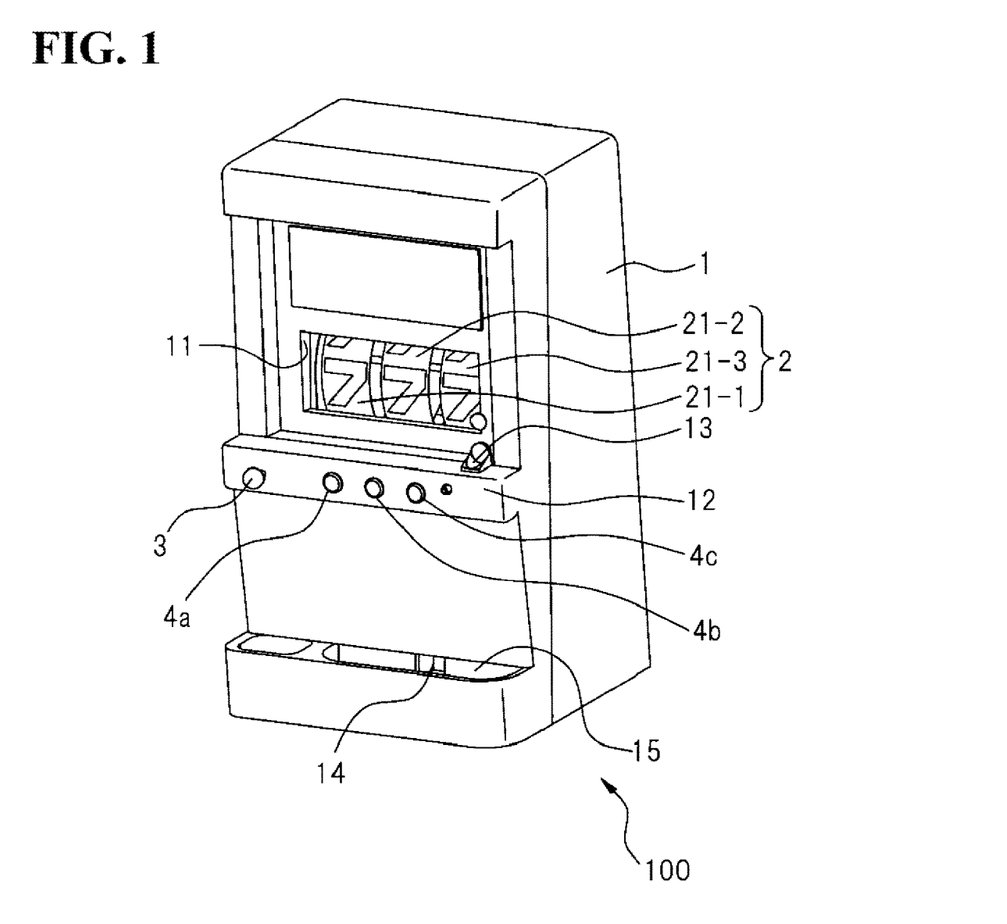
FIG. 1 is a schematic configuration diagram of a slot machine provided with a drum unit having light guide plates and decoration devices according to one embodiment of the present invention.

FIG. 1 is a schematic configuration diagram of a slot machine provided with a drum unit having light guide plates and decoration devices according to one embodiment of the present invention. As shown in FIG. 1, a slot machine 100 has a main body casing 1, which is the main body of the game machine, a drum unit 2, a start lever 3, and stop buttons 4a to 4c.

Also, the slot machine 100 has, inside the main body casing 1, a control circuit (not shown) that controls the components of the slot machine 100, a power supply circuit (not shown) that supplies power to the components of the slot machine 100, and a token storage and discharge mechanism (not shown) for temporarily storing tokens and for discharging tokens according to a control signal from the control circuit.

An opening 11 is formed in an upper middle portion of the front surface of the main body casing 1, and a portion of the drum unit 2 is visible through the opening 11. Also, a token insertion slot 13 for inserting tokens is formed in the upper surface of a frame 12 on the lower side of the opening 11.

The drum unit 2 has three drums 21-1 to 21-3. The drums 21-1 to 21-3 are each separately rotatable according to a control signal from the control circuit, with a rotation shaft (not shown) that is substantially horizontal and substantially parallel to the front surface of the main body casing 1 as the rotation center. The surfaces of the drums 21-1 to 21-3 are each divided in the rotation direction into a plurality of regions having substantially the same width, and various patterns are depicted in the different regions, with a portion of these regions being visible to the gamer through the opening 11. Note that the drum unit 2 will be discussed in detail later.

The start lever 3 is provided on the left side when facing the front surface of the frame 12 of the main body casing 1. Also, the stop buttons 4a to 4c are provided substantially in the middle of the front surface of the frame 12. The stop buttons 4a to 4c respectively correspond to the drums 21-1 to 21-3.

A token discharge port 14 for discharging tokens is formed in a lower portion of the front surface of the main body casing 1. A token receiver 15 for preventing discharged tokens from dropping to the ground is attached below the token discharge port 14.

When the start lever 3 is operated after a token is inserted into the token insertion slot 13, a signal indicating that the start lever 3 was operated is transmitted to the control circuit. The control circuit then starts rotation of the drums 21 to 23.

Thereafter, when any of the stop buttons 4a to 4c provided substantially in the middle of the front surface of the frame 12 of the main body casing 1 is pressed, the control circuit receives a signal from the button that was pressed indicating that the button was pressed, and stops rotation of the drum corresponding to the button that was pressed. Alternatively, any of the drums 21-1 to 21-3 whose corresponding stop button is not pressed before a predetermined period elapses after starting the rotation is stopped by the control circuit after the predetermined period has elapsed.

When the same pattern is aligned in a row across all of the drums at the point in time at which all the drums have stopped, the control circuit discharges a predetermined number of tokens that depends on the pattern through the token discharge port 14.

Next, the drum unit 2 will be described in detail.

Figure 2:
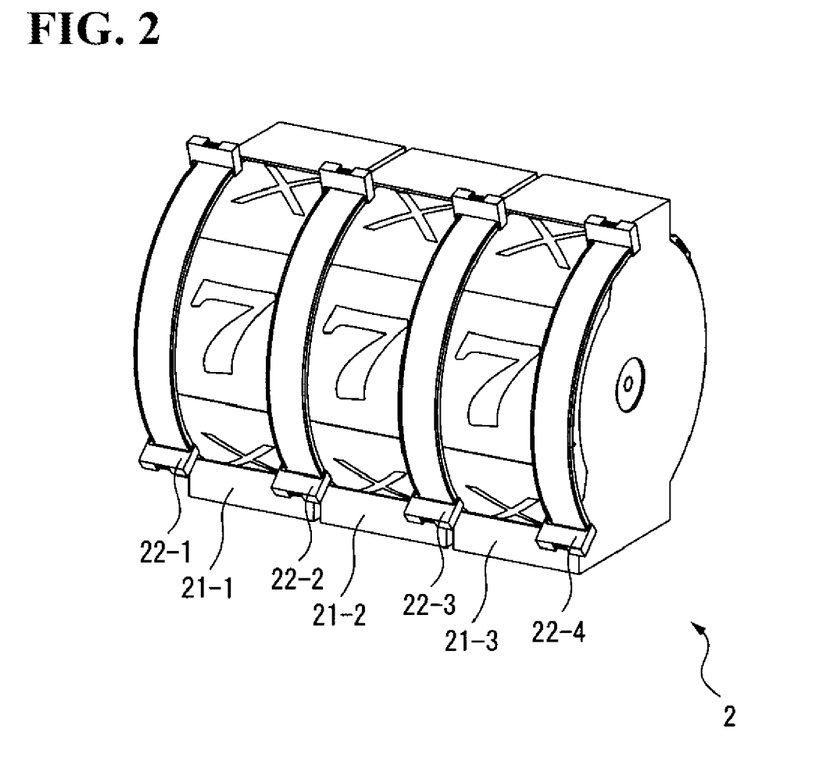
FIG. 2 is a schematic perspective view of an entire drum unit according to one embodiment of the present invention.

FIG. 2 is a schematic perspective view of the entire drum unit 2. As shown in FIG. 2, the drum unit 2 has the three drums 21-1 to 21-3, and four decoration devices 22-1 to 22-4. As discussed above, the drums 21-1 to 21-3 are each separately rotatable according to a control signal from the control circuit, with a rotation shaft (not shown) that is substantially horizontal and substantially parallel to the front surface of the main body casing 1 as the rotation center. Also, the decoration devices 22-1 to 22-4 are respectively arranged near the boundaries of the drums 21-1 to 21-3, such that the longitudinal direction thereof is in the rotation direction of the drums 21-1 to 21-3, that is, in the vertical direction. The decoration devices 22-1 to 22-4 are capable of switching between and displaying a plurality of patterns according to a control signal from the control circuit. Note that each of the decoration devices 22-1 to 22-4 has a light guide plate according to one embodiment of the present invention.

Note that because the drums 21-1 to 21-3 have the same structure, the drum 21-1 will be described hereinafter. Similarly, because the decoration devices 22-1 to 22-4 have the same structure except for the patterns that are displayed, the decoration device 22-1 will be described hereinafter.

Figure 3A:
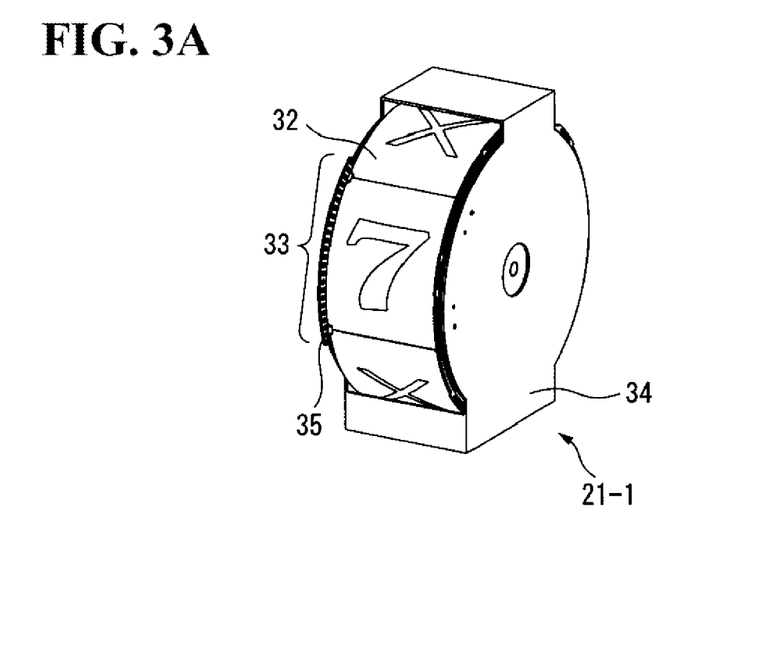
FIG. 3A is a schematic perspective view of an individual drum that is included in the drum unit.
Figure 3B:
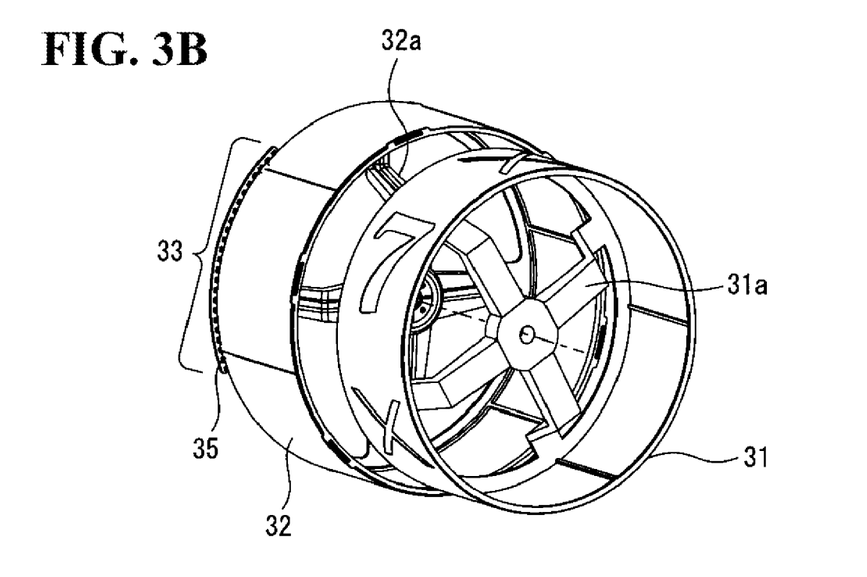
FIG. 3B is an exploded perspective view of the drum.

FIG. 3A is a schematic perspective view of the drum 21-1, and FIG. 3B is an exploded perspective view of parts of the drum 21-1 other than the casing. The drum 21-1 has a cylindrically formed display panel 31, a cylindrically formed light guide plate 32 provided along the outer circumference of the display panel 31, a light source unit 33 provided along a portion of the side surface of the light guide plate 32, and a casing 34 that supports the display panel 31, the light guide plate 32 and the light source unit 33.

The display panel 31 and the light guide plate 32 are attached to the casing 34 such that shafts thereof that are substantially horizontal and substantially parallel to the front surface of the main body casing 1 are coaxial with each other, in a state where the drum unit 2 is attached to the main body casing 1. The display panel 31 is attached to a rotation shaft (not shown) via a support member 31a provided inside thereof. The rotation shaft of the display panel 31 is connected via gears to a rotation shaft of a stepping motor (not shown) for use in driving the display panel 31. As a result of the stepping motor rotating according to a control signal from the control circuit, the display panel 31 rotates in the vertical direction with the rotation shaft as the rotation center.

The surface of the display panel 31 is divided in the rotation direction into a plurality of regions each having substantially the same width, and various patterns are depicted in the different regions, with a portion of these regions being visible to the gamer through the light guide plate 32 and the opening 11.

The light guide plate 32 is also attached to a rotation shaft (not shown) provided coaxially with the rotation shaft of the display panel 31 via a support member 32a provided on the inside thereof, and can be independently rotated relative to the display panel 31. The rotation shaft of the light guide plate 32 is connected via gears to a rotation shaft of a stepping motor (not shown) for use in driving the light guide plate 32. The light guide plate 32 rotates in the vertical direction, as a result of the stepping motor for use in driving the light guide plate 32 rotating according to a control signal from the control circuit.

Note that, according to a variation, the light guide plate 32 may be fixedly attached coaxially to the display panel 31, so as to not rotate.

The light source unit 33 has a plurality of light emitting elements 35 that emit visible light such as light emitting diodes, for example. The light emitting elements 35 are arranged in a row along one sidewall of the light guide plate 32, at a position overlapping with the opening 11 of the main body casing 1. The light emitting elements 35 are arranged such that the light emitting surface of each light emitting element 35 opposes the light guide plate 32. For example, the light emitting elements 35 are arranged such that the direction in which the light emission intensity thereof is strongest is orthogonal to the sidewall of the light guide plate 32 that serves as the incident surface thereof. The light source unit 33 turns each light emitting element 35 on or off according to a control signal from the control circuit. At that time, the light source unit 33 may turn on all of the light emitting elements 35 at the same time, or may turn on only some of the light emitting elements 35.

Hereinafter, the light guide plate 32 will be described in greater detail.

The light guide plate 32 is formed by cylindrically molding a resin that is transparent to visible light, such as polymethyl methacrylate (PMMA), polycarbonate or cycloolefin polymer, for example, so that the patterns of the display panel 31 arranged on the inner circumferential side of the light guide plate 32 are visible to the gamer through the light guide plate 32. Also, the light guide plate 32 displays a predetermined pattern using the light from the light source unit 33.

Figure 4A:
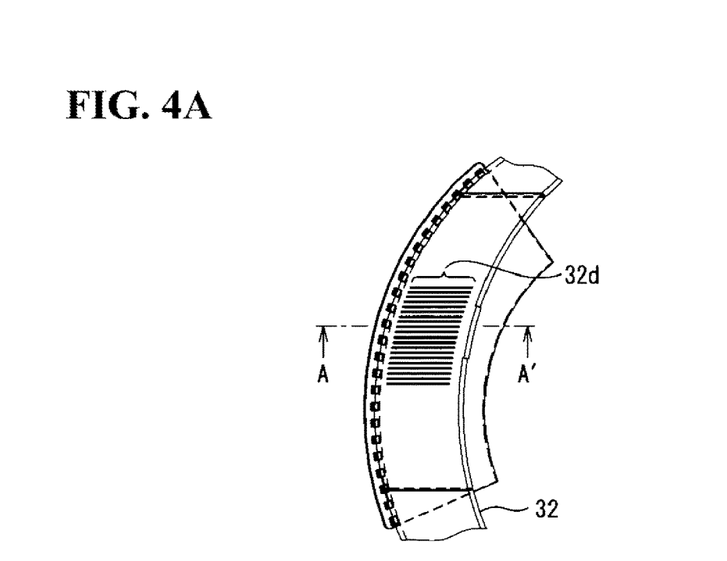
FIG. 4A is an enlarged partial view of a light guide plate that is included in the drum.
Figure 4B:
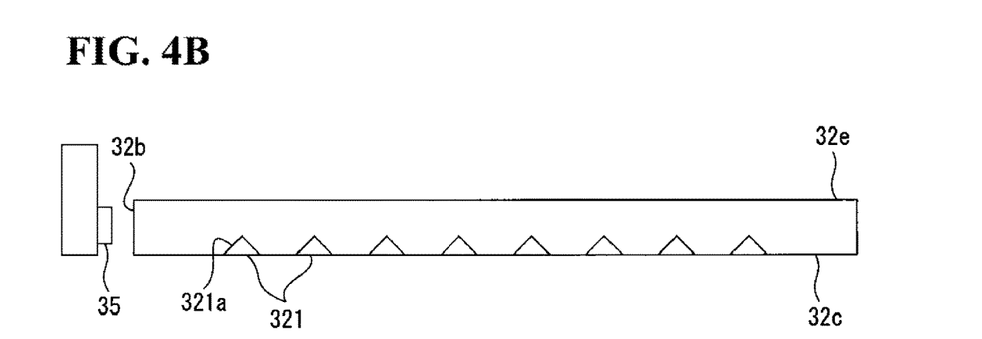
FIG. 4B is a cross-sectional side view of the light guide plate as seen from the direction of arrows AA' in FIG. 4A.

FIG. 4A is an enlarged partial view of the light guide plate 32. Also, FIG. 4B is a cross-sectional side view of the light guide plate 32 as seen from the direction of arrows AA' in FIG. 4A. It should be noted that, in FIG. 4B, dimensions such as the thickness of the light guide plate 32 and the size of each prism are exaggerated for convenience of description. As shown in FIGS. 3A, 4A and 4B, one of the sidewalls of the light guide plate 32 is an incident surface 32b opposing the light emitting elements 35 of the light source unit 33. Light from the light emitting elements 35 enters the light guide plate 32 through the incident surface 32b.

In a diffusing surface 32c, which is the surface on the inner circumferential side of the light guide plate 32, that is, the surface on the side opposing the display panel 31, a plurality of prisms 321 are formed in a grid at a predetermined pitch along a pattern 32d. Note that the plurality of prisms 321 may be arranged so as to be staggered at a predetermined pitch. The plurality of prisms 321 reflect the light from the light emitting elements 35 that enters the light guide plate 32 from the incident surface 32b and cause the reflected light to exit from an exit surface 32e, which is the surface on the outer circumferential side of the light guide plate 32, such that the pattern 32d appears to emit light. Note that the pattern 32d can be any pattern that allows a plurality of prisms 321 to be arranged within the pattern 32d. Also, the pattern 32d may have a different sub-pattern for every different position in the rotation direction of the light guide plate 32. As a result of the light guide plate 32 rotating, the gamer is thereby able to see different patterns.

Each of the plurality of prisms 321 is, for example, formed in the diffusing surface 32c as a substantially triangular groove having a predetermined length. Each of the plurality of prisms 321 has a reflecting surface 321a oriented toward the incident surface 32b side so as to form a predetermined angle with the diffusing surface 32c and oppose the light emitting elements 35. In the present embodiment, because the light emitting elements 35 are arrayed along one sidewall of the light guide plate 32 which rotates in the vertical direction, light from the light emitting elements 35 propagates inside the light guide plate 32 so as to spread up and down about the horizontal direction. For this reason, the reflecting surface 321a of the prisms 321 is formed so as to be oriented substantially in the horizontal direction. Note that the predetermined angle is an angle at which light from the light emitting elements 35 that enters the light guide plate 32 is totally reflected toward the exit surface 32e, and is set to be 40 to 50 degrees relative to the diffusing surface, for example. Also, the predetermined length is set from about 100 μm to several millimeters, for example.

As discussed above, light from the light emitting elements 35 enters inside the light guide plate 32 from the incident surface 32b. Light propagated inside the light guide plate 32 then exits from the exit surface 32e after being totally reflected by the plurality of prisms 321 formed in the diffusing surface 32c. Because the plurality of prisms 321 are arrayed along the pattern 32d, the gamer is able to see the pattern 32d which appears to emits light, through the opening 11, together with the pattern provided on the surface of the display panel 31, while the light emitting elements 35 are on. On the other hand, while the light emitting elements 35 are off, the gamer is able to see only the pattern provided on the surface of the display panel 31 through the opening 11. In this way, the pattern that is visible to the gamer can be switched by on/off control of the light emitting elements 35. Furthermore, because the display panel 31 and the light guide plate 32 are rotatable independently from each other, changing the combination of the portion of the display panel 31 that faces the opening 11 and the portion of the light guide plate 32 that faces the opening 11 enables the combinations of patterns on the drum 21-1 that are visible to the gamer to be variously changed.

Furthermore, the path of light from the light emitting elements 35 to the gamer becomes longer as the distance from the incident surface 32b increases. Also, because the light from the light emitting elements 35 is specularly reflected by the prisms 321, the light appears to be shining at a greater depth, the further the position is from the incident surface 32b. Thus, the pattern 32d is displayed three-dimensionally.

Also, in the present embodiment, the light guide plate 32 is curved in the vertical direction. Thus, light from light emitting elements 35 that are located higher than the position of the foot of a perpendicular from the position of the gamer's eyes to the surface of the light guide plate 32 is reflected toward the gamer by prisms that are located lower down as the distance from the incident surface increases. Note that light from these light emitting elements 35 that is incident perpendicular to the incident surface 32b is reflected above the position of the gamer's eyes.

Conversely, light from light emitting elements 35 that are located lower than the position of the foot of this perpendicular is reflected toward the gamer by prisms that are located higher up as the distance from the incident surface increases. Note that light from these light emitting elements 35 that is incident perpendicular to the incident surface 32b is reflected below the position of the gamer's eyes. Accordingly, light from the individual light emitting elements appears linear to the gamer within the pattern 32d, and also the interval between light beams appears to narrow, the further the distance is from the incident surface 32b.

In view of this, according to a variation, the prisms may be formed such that, in the case where the light guide plate 32 stops at a predetermined rotation position, the reflecting surface of prisms that are located above the position of the foot of the perpendicular from the assumed position of the gamer's eyes to the surface of the light guide plate 32 is oriented more toward the foot, the more distant the prism is from the position of the foot, and the reflecting surface of prisms that are located below the position of the foot of this perpendicular is oriented more toward the foot, the more distant the prism is from the position of the foot. It is thereby possible to show patterns to the gamer such that light from the individual light emitting elements forms parallel light beams.

Furthermore, the arrangement density, which is a ratio of the area of the region in which the prisms 321 are formed to the area of the region in which the pattern 32d is formed is preferably less than or equal to an upper limit of the arrangement density at which the gamer feels as though he or she is viewing the pattern displayed on the display panel 31, which is on the inner circumferential side of the light guide plate 32, through a transparent member or through empty space, when the light emitting elements 35 are off. In view of this, the prisms 321 are preferably formed such that the arrangement density is 30.0% or less, for example.

Alternatively, a haze value representing the proportion of diffused light to all transmitted light is preferably less than or equal to an upper limit of the haze value at which the gamer feels as though he or she is viewing the pattern displayed on the display panel 31, which is on the inner circumferential side of the light guide plate 32, through a transparent member or through empty space, when the light emitting elements 35 are off. The prisms 321 are preferably formed such that the haze value is 28% or less, for example.

Figure 5A:
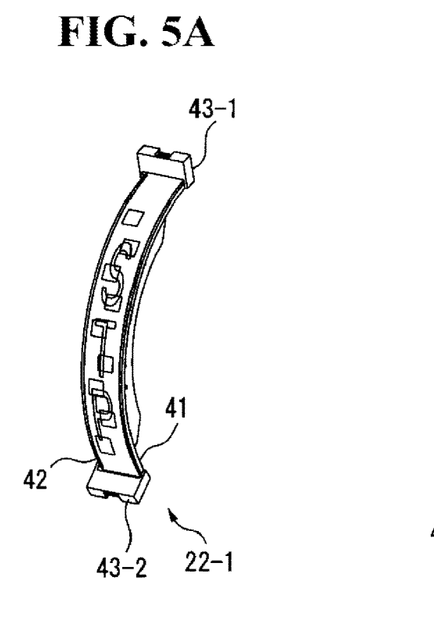
FIG. 5A is a schematic perspective view of the decoration device.
Figure 5B:
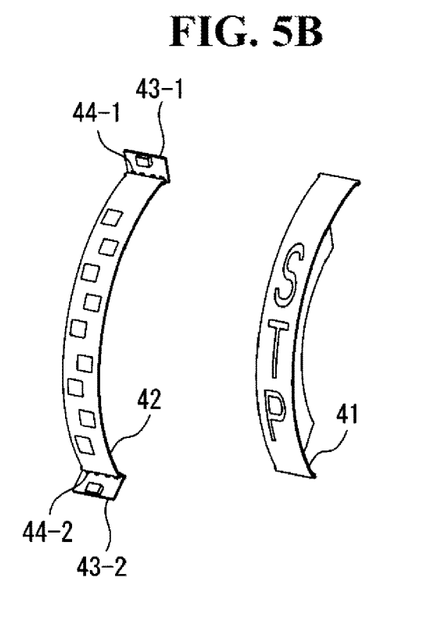
FIG. 5B is an exploded perspective view of the decoration device.

FIG. 5A is a schematic perspective view of the decoration device 22-1, and FIG. 5B is an exploded perspective view of the decoration device 22-1. As shown in FIGS. 5A and 5B, the decoration device 22-1 has a display panel 41, a light guide plate 42 according to one embodiment of the present invention, and two light source units 43-1 and 43-2.

The display panel 41 is arranged such that the longitudinal direction thereof is in the circumferential direction of the drum 21-1. Thus, the display panel 41 has a cylindrical surface shape whose longitudinal direction is curved along the outer circumference of the drum 21-1. A pattern that depends on the presentation is depicted on the surface of the display panel 41, and the pattern is visible to the gamer through the light guide plate 42 and the opening 11.

The light guide plate 42 is provided on the surface of the display panel 41, that is, the surface on the gamer side of the display panel 41, and displays a pattern formed by the light from the light emitting elements of the light source units 43-1 and 43-2 to the user, so as to be superimposed on the pattern on the display panel 41. Thus, the light guide plate 42 has a cylindrical surface shape whose longitudinal direction is curved along the surface of the display panel 41, and is formed by molding a resin that is transparent to visible light, such as polymethyl methacrylate (PMMA), polycarbonate and cycloolefin polymer, for example.

The light source unit 43-1 has a plurality of light emitting elements 44-1 that emit visible light such as light emitting diodes, for example. The light emitting elements 44-1 are arranged in a row along the upper end of the light guide plate 42. The light emitting elements 44-1 are arranged such that the light emitting surface of each light emitting element 44-1 opposes the upper end of the light guide plate 42. For example, the light emitting elements 44-1 are arranged such that the direction in which the light emission intensity thereof is strongest is orthogonal to the upper end of the light guide plate 42. The light source unit 43-1 turns each light emitting element 44-1 on or off according to a control signal from the control circuit. At this time, the light source unit 43-1 may turn on all of the light emitting elements 44-1 at the same time, or may turn on only some of the light emitting elements 44-1.

Similarly, the light source unit 43-2 has a plurality of light emitting elements 44-2 that emit visible light such as light emitting diodes, for example. The light emitting elements 44-2 are arranged in a row along the lower end of the light guide plate 42. The light emitting element 44-2 are arranged such that the light emitting surface of each light emitting element 44-2 opposes the lower end of the light guide plate 42. For example, the light emitting elements 44-2 are arranged such that the direction in which the light emission intensity is strongest is orthogonal to the lower end of the light guide plate 42. The light source unit 43-2 turns each light emitting element 44-2 on or off according to a control signal from the control circuit. At this time, the light source unit 43-2 may turn on all of the light emitting elements 44-2 at the same time, or may turn on only some of the light emitting elements 44-2. Note that a light source unit may be provided at only the upper end or the lower end of the light guide plate 42.

Figure 6A:
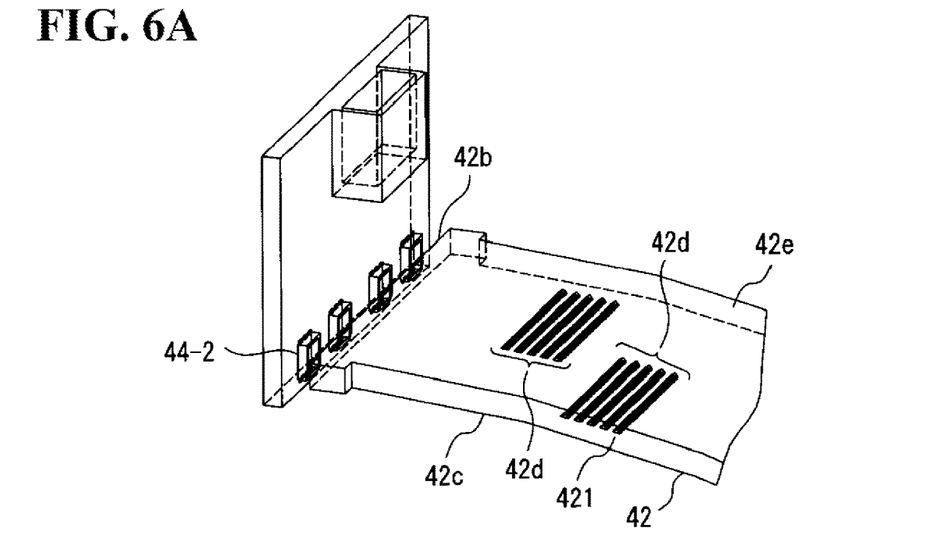
FIG. 6A is an enlarged partial view of a light guide plate according to one embodiment of the present invention that is included in the decoration device.
Figure 6B:
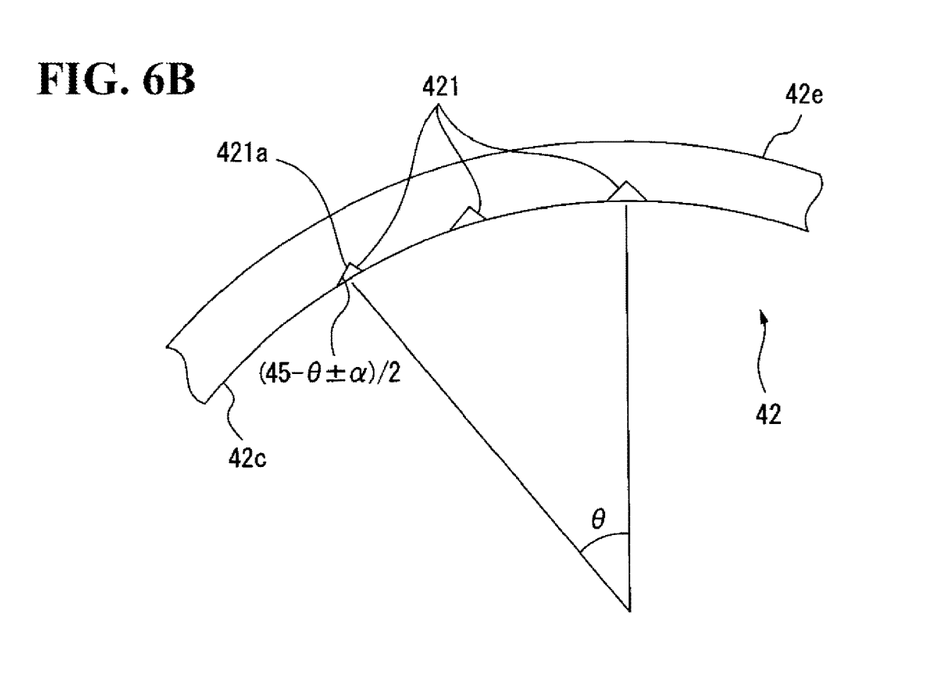
FIG. 6B is a schematic partial cross-sectional view of the light guide plate in vertical cross-section.

FIG. 6A is an enlarged partial view of the light guide plate 42. Also, FIG. 6B is a schematic partial cross-sectional view of the light guide plate 42 in vertical cross-section. It should be noted that, in FIG. 6B, only some of the prisms are displayed, and that dimensions such as the size of the prisms and the thickness of the light guide plate are exaggerated for convenience of description. As shown in FIGS. 6A and 6B, the upper end surface and the lower end surface of the light guide plate 42, that is, both end surfaces of the light guide plate in the direction in which the light guide plate has curvature, are each an incident surface 42b. Light from the light emitting elements enters the light guide plate 42 through the incident surfaces 42b.

In a diffusing surface 42c, which is a concave cylindrical surface on the back surface side of the light guide plate 42, that is, on the side opposing the display panel 41, a plurality of prisms 421 are formed in a grid at a predetermined pitch along a pattern 42d. Note that the plurality of prisms 421 may be arranged so as to be staggered at a predetermined pitch. The plurality of prisms 421 reflect light from the light emitting elements 44-1 that enters the light guide plate 42 from the incident surface 42b at the upper end or light from the light emitting elements 44-2 that enters the light guide plate 42 from the incident surface 42b at the lower end, and cause the reflected light to exit from an exit surface 42e, which is a convex cylindrical surface opposing the diffusing surface 42c, such that the pattern 42d is visible to the gamer. Note that the pattern 42d can be any pattern that allows a plurality of prisms 421 to be arranged within the pattern 42d.

Each of the plurality of prisms 421 is, for example, formed in the diffusing surface 42c as a substantially triangular groove having a predetermined length. Each of the plurality of prisms 421 has a reflecting surface 421a oriented toward the incident surface 42b side so as to form a predetermined angle with the diffusing surface 42c and oppose the light emitting elements 44-1 or the light emitting elements 44-2. In the present embodiment, because the light emitting elements 44-1 and the light emitting elements 44-2 are arrayed along the upper end or the lower end of the light guide plate 42, light from the light emitting elements propagates inside the light guide plate 42 so as to spread right and left about the vertical direction. Thus, the reflecting surface 421a of the prisms 421 is formed so as to be oriented substantially in the vertical direction. Note that the predetermined length is set from about 100 μm to several millimeters, for example.

Light from the light emitting elements 44-1 and 44-2 enters inside the light guide plate 42 from the incident surface 42b. Light propagated inside the light guide plate 42 then exits from the exit surface 42e, after being totally reflected by the plurality of prisms 421 formed in the diffusing surface 42c. Because the plurality of prisms 421 are arrayed along the pattern 42d, the gamer is able to see the pattern 42d which appears to emits light, through the opening 11, together with the pattern provided on the surface of the display panel 41, while the light emitting elements 44-1 and 44-2 are on. On the other hand, while the light emitting elements 44-1 and 44-2 are off, the gamer is able to see only the pattern provided on the surface of the display panel 41 through the opening 11. In this way, the pattern that is visible to the gamer can be switched by on/off control of the light emitting elements 44-1 and 44-2.

Note that, according to a variation, a plurality of prisms 421 may be provided over the entire diffusing surface 42c. In this case, the decoration device 22-1 is able to show patterns to the gamer as though the entire light guide plate 42 is lit up, while the light emitting elements 44-1 and 44-2 are on.

As discussed above, the light guide plate 42 curves such that the diffusing surface 42c side is concave in the longitudinal direction, that is, in the vertical direction. Thus, when the angle of the reflecting surface 421a of each prism relative to the diffusing surface 42c is the same, the reflecting surface 421a is oriented more upwardly, the closer the prism is to the upper end of the light guide plate 42, and is conversely oriented more downwardly, the closer the prism is to the lower end of the light guide plate 42, resulting in the light that exits from the exit surface 42e spreading vertically. In view of this, in the present embodiment, the prisms 421 are formed such that the angle of the reflecting surface 421a relative to the diffusing surface 42c increases, the closer the prism is to the midpoint of the light guide plate 42 in the vertical direction, that is, the further the prism is from the incident surface 42b. For example, if the angle formed by a line connecting to the center of the arc along the diffusing surface 42c from an arbitrary position P on the diffusing surface 42c and a line connecting between the center of the arc and a midpoint of the diffusing surface 42c in the vertical direction is given as θ, the prisms 421 are preferably formed such that the angle formed by the reflecting surface 421a of the prism 421 and the diffusing surface 42c at the position P will be (45−θ/2±α)° (where α is 0 to 5, for example). Thereby, irrespective of the position of the prism, the orientation of the center of distribution of light that is reflected by that prism and exits from the exit surface 42e of the light guide plate 42 will be substantially parallel to the line connecting the midpoint of the diffusing surface 42c in the vertical direction and the center of the arc along the diffusing surface 42c. Thus, the luminance distribution of light that exits the light guide plate 42, when the decoration device 22-1 is seen from the direction along an extension of that line, will be substantially uniform.

Furthermore, the prisms are preferably formed such that the size of the reflecting surface 421a increases, the further the prism is from the midpoint of the light guide plate 42 in the vertical direction. Because the difference in apparent size of the reflecting surfaces of the prisms, when the decoration device 22-1 is seen from the direction along an extension of the line connecting the midpoint of the diffusing surface 42c in the vertical direction and the center of the arc along the diffusing surface 42c, can be reduced, the luminance distribution of light that exits from the light guide plate 42, when the decoration device 22-1 is seen from that direction, can be equalized.

Note that, similarly for the light guide plate 42, the arrangement density, which is a ratio of the area of the region in which the prism 421 is formed to the area of the region in which the pattern 42d is formed, is preferably less than or equal to an upper limit of the arrangement density at which the gamer feels as though he or she is viewing the pattern displayed on the display panel 41 through a transparent member or through empty space, when the light emitting elements 44-1 and 44-2 are off. In view of this, the prisms 421 are preferably formed such that the arrangement density is 30.0% or less, for example.

Alternatively, similarly for the light guide plate 42, a haze value representing the proportion of diffused light to all transmitted light is preferably less than or equal to an upper limit of the haze value at which the gamer feels as though he or she is viewing the pattern displayed on the display panel 41 through a transparent member or through empty space, when the light emitting elements 44-1 and 44-2 are off. The prisms 421 are preferably formed such that the haze value is 28% or less, for example.

In the present embodiment, because the path of light from the light emitting elements 44-1 or 44-2 to the gamer becomes longer as the distance to the midpoint of the light guide plate 42 decreases in the vertical direction, the light appears to be shining at a greater depth, the closer the position is to the midpoint of the light guide plate 42 in the vertical direction. Thus, the pattern 42d is displayed three-dimensionally. Also, by arranging the light emitting elements such that the horizontal position of the light emitting elements 44-1 and the horizontal position of the light emitting elements 44-2 coincide, the pattern 42d can be shown as though lit up linearly from within along straight lines connecting the light emitting elements 44-1 and the light emitting elements 44-2.

As described above, this light guide plate and the decoration device using the light guide plate are able to switch the pattern that is displayed simply by switching the light emitting elements between on and off, thus enabling a reduction in the number of the light emitting elements that are required to switch the pattern that is displayed. Furthermore, this light guide plate and the decoration device using the light guide plate can be attached to a portion that curves in an arc, and are able to cause light that propagates inside the light guide plate to exit in a specific direction.

Note that the present invention is not limited to the foregoing embodiments. For example, this light guide plate may be utilized in decorating structures having a cylindrical surface shape in other game machines or various devices that use decoration using illuminated light.

A person skilled in the art will thus be able to make various modifications within the scope of the invention, in accordance with modes to be carried out.

The invention claimed is:

1. A light guide plate in which a diffusing surface that diffuses incident light is formed to have a concave cylindrical surface shape with curvature in a first direction, an exit surface opposing the diffusing surface is formed to have a convex cylindrical surface shape with curvature in the first direction, and the light guide plate is constituted such that a pattern provided behind the diffusing surface is visible from the exit surface side,
wherein the light guide plate includes:
an incident surface formed on at least one end of the light guide plate in the first direction; and
a plurality of prisms that are formed in the diffusing surface and reflect visible light that enters the light guide plate from the incident surface toward the exit surface, and
each of the plurality of prisms has a reflecting surface oriented toward the incident surface side, and an angle between the reflecting surface and the diffusing surface increases, the further the prism is from the incident surface.

2. The light guide plate according to claim 1, wherein the plurality of prisms are arranged along a predetermined pattern.

3. The light guide plate according to claim 2, wherein
a ratio of an area of a first region in which the plurality of prisms are formed to an area of a second region in which the predetermined pattern is formed is 30.0% or less.

4. The light guide plate according to claim 1, wherein each of the plurality of prisms is formed such that an area of the reflecting surface increases, the closer the prism is to the incident surface among the plurality of prisms.

5. The light guide plate according to claim 1, wherein
the incident surface comprises a first incident surface and a second incident surface which are respectively provided at both ends of the light guide plate in the first direction.

6. The light guide plate according to claim 1, wherein the light guide plate is formed of transparent resin.

7. The light guide plate according to claim 1, wherein the plurality of prisms are formed in a grid having a predetermined pitch between the plurality of prisms.

8. The light guide plate according to claim 1, wherein each of the plurality of prisms is formed in the diffusing surface as a substantially triangular groove having a predetermined length along a longitudinal direction of each prism.

9. The light guide plate according to claim 8, wherein the predetermined length is from about 100 μm to several millimeters.

* * * * *